(12) United States Patent
Cao et al.

(10) Patent No.: US 10,581,239 B2
(45) Date of Patent: Mar. 3, 2020

(54) DEVICE AND METHOD FOR PROTECTING DIRECT CURRENT SOURCE

(71) Applicant: SUNGROW POWER SUPPLY CO., LTD., Hefei, Anhui (CN)

(72) Inventors: Renxian Cao, Anhui (CN); Yin Yuan, Anhui (CN); Baoqi Liu, Anhui (CN); Yongli Xiao, Anhui (CN); Xiaoyu Chen, Anhui (CN)

(73) Assignee: SUNGROW POWER SUPPLY CO., LTD., Hefei, Anhui (CN)

( * ) Notice: Subject to any disclaimer, the term of this patent is extended or adjusted under 35 U.S.C. 154(b) by 432 days.

(21) Appl. No.: 15/474,006

(22) Filed: Mar. 30, 2017

(65) Prior Publication Data

US 2017/0365999 A1 Dec. 21, 2017

(30) Foreign Application Priority Data

Jun. 17, 2016 (CN) .......................... 2016 1 0450855

(51) Int. Cl.
*H02H 9/02* (2006.01)

(52) U.S. Cl.
CPC .................................. *H02H 9/025* (2013.01)

(58) Field of Classification Search
CPC ........ H02H 9/025; H02M 1/096; H02M 1/32; H02M 1/34; H02J 3/383; H01L 31/02021; H02S 40/30
USPC ...................................................... 361/93.9
See application file for complete search history.

(56) References Cited

U.S. PATENT DOCUMENTS

| 4,401,927 | A | 8/1983 | N'Guyen et al. |
| 5,485,341 | A | 1/1996 | Okado et al. |
| 2004/0223277 | A1* | 11/2004 | Cheng .................. H02M 1/096 361/100 |
| 2011/0025130 | A1 | 2/2011 | Hadar et al. |

(Continued)

FOREIGN PATENT DOCUMENTS

| CN | 1089043 A | 7/1994 |
| CN | 201682411 U | 12/2010 |
| CN | 102347602 A | 2/2012 |

(Continued)

OTHER PUBLICATIONS

Machine translation of Gerads et al. German Patent Document DE 10 2005 018 173 A1 Oct. 26, 2006 (Year: 2006).*

(Continued)

*Primary Examiner* — Kevin J Comber
(74) *Attorney, Agent, or Firm* — Cantor Colburn LLP

(57) ABSTRACT

A device for protecting a direct current source and method are provided. Electric energy outputted from the direct current source is stored and an enable signal is received by the hiccup drive circuit. In a case that the enable signal is an OFF-ENABLE signal, the driving signal is generated based on the electric energy stored internally. By periodically switching on the switching device based on the driving signal, the output voltage of the direct current source is periodically short-circuited. Therefore, the issue of a large conduction loss in the conventional art is avoided, which is caused by the fact that a minimum required voltage for driving the electronic switch is required to be continuously provided by the output voltage of the direct current source.

18 Claims, 10 Drawing Sheets

(56) References Cited

U.S. PATENT DOCUMENTS

2016/0226256 A1    8/2016  Falk et al.

FOREIGN PATENT DOCUMENTS

| | | | |
|---|---|---|---|
| CN | 103346538 A | 10/2013 | |
| CN | 203233391 U | 10/2013 | |
| CN | 103701445 A | 4/2014 | |
| DE | 3041078 A1 | 6/1982 | |
| DE | 102005018173 A1 | 10/2006 | |
| DE | 102010023761 A1 * | 10/2011 | ....... H01L 31/02021 |
| DE | 102013110240 A1 | 3/2015 | |
| EP | 2398123 A2 | 12/2011 | |
| JP | S5721228 U | 2/1982 | |
| JP | S60162946 U | 10/1985 | |
| JP | H0226237 A | 1/1990 | |
| JP | 09117131 A2 | 2/1997 | |
| JP | 10066251 A2 | 6/1998 | |
| JP | 2013212048 A2 | 10/2013 | |
| WO | 2015033563 A1 | 3/2015 | |
| WO | 2015039998 A2 | 3/2015 | |

OTHER PUBLICATIONS

Machine translation of Baader German Patent Document DE 10 2010 023 761 A1 Oct. 27, 2011 (Year: 2011).*

European First Office Action corresponding to Application No. 17162 923.1-1201; dated Aug. 24, 2018.

Extended European Search Report for corresponding Application No. 17162923.1-1809; dated Aug. 23, 2017.

JP Notification of Reasons for Refusal corresponding to Application No. 2017-067803; dated Jan. 9, 2018.

SIPO First Office Action corresponding to Application No. 201610450855.3; dated Dec. 7, 2017.

* cited by examiner

DEVICE AND METHOD FOR PROTECTING DIRECT CURRENT SOURCE

CROSS REFERENCE OF RELATED APPLICATION

This application claims the priority to Chinese Patent Application No. 201610450855.3, entitled "DEVICE AND METHOD FOR PROTECTING DIRECT CURRENT SOURCE", filed with the Chinese State Intellectual Property Office on Jun. 17, 2016, which is incorporated by reference in its entirety herein.

TECHNICAL FIELD

The present disclosure relates to the technical field of a safe mode of a direct current source, and in particular to a device and a method for protecting a direct current source.

BACKGROUND

In a scenario in which a direct current source is applied, an output voltage of the direct current source should be limited to a safe range in a process of performing maintenance or dealing with other emergencies. A protection device as shown in FIG. 1 may be adopted. Specifically, an electronic switch S1 may be switched on, so that an output terminal of a direct current source is short-circuited and an output voltage of the direct current source is limited to the safe range.

The failure mode of the electronic switch S1 is generally a mode in which the electronic switch S1 is short-circuited, and the protection will be provided even if the electronic switch S1 is in the failure mode. However, it is difficult for the device for protecting the direct current source in the short-circuited mode to provide a driving voltage for the electronic switch S1, since there is no sufficient drive voltage to drive the electronic switch S1 to be switched on in the absence of an additional power supply in a case that the direct current source is short-circuited. As shown in FIG. 1, if the driving voltage of the electronic switch S1 is provided by the direct current source, the output voltage of the direct current source will be maintained in a minimum required voltage for driving the electronic switch S1. Therefore, the electronic switch S1 has a relatively large conduction loss and even cannot work for a long time.

SUMMARY

In order to address the above technical issue of a large conduction loss in the conventional art, a device and a method for protecting a direct current source are provided according to the present disclosure.

In order to achieve the above object, the technical solutions of the present disclosure are as follows.

A device for protecting a direct current source is provided, which includes a hiccup driver circuit and a switching device. Power supply terminals of the hiccup driver circuit are connected with a positive output terminal and a negative output terminal of the direct current source respectively. An input terminal of the hiccup driver circuit receives an enable signal. The hiccup driver circuit is configured to store electric energy outputted from the direct current source, receive the enable signal, and generate a driving signal based on the enable signal and the electric energy stored internally. A control terminal of the switching device is connected with an output terminal of the hiccup driver circuit. A first terminal of the switching device is connected with the positive output terminal of the direct current source, with a connection point between the first terminal of the switching device and the positive output terminal of the direct current source being a positive output terminal of the device for protecting the direct current source. A second terminal of the switching device is connected with the negative output terminal of the direct current source, with a connection point between the second terminal of the switching device and the negative output terminal of the direct current source being a negative output terminal of the device for protecting the direct current source. The switching device is configured to be periodically switched on according to the driving signal in a case that the enable signal is an OFF-ENABLE signal.

Preferably, the hiccup driver circuit may include a voltage limiting circuit and a driver circuit. Input terminals of the voltage limiting circuit are the power supply terminals of the hiccup driver circuit. The voltage limiting circuit is configured to store the electric energy outputted from the direct current source and generate a supply voltage based on the electric energy stored internally. A first input terminal of the driver circuit is the input terminal of the hiccup driver circuit. A second input terminal of the driver circuit is connected with an output terminal of the voltage limiting circuit. A third input terminal of the driver circuit is connected with the negative output terminal of the direct current source. An output terminal of the driver circuit is the output terminal of the hiccup driver circuit. The driver circuit is configured to receive the enable signal, generate a driving signal for controlling the switching device to be switched on and consume the electric energy stored internally, in a case that the enable signal is an OFF-ENABLE signal and the supply voltage meets a first preset condition. The driver circuit is configured to generate a driving signal for controlling the switching device to be switched off in a case that the enable signal is a NON-OFF-ENABLE signal or the supply voltage meets a second preset condition.

Preferably, the voltage limiting circuit may include a first diode, a first capacitor, a first resistor, a Zener diode, a second capacitor, a second resistor and a third capacitor. An anode of the first diode may be connected with the positive output terminal of the direct current source. A cathode of the first diode may be connected with a first terminal of the first capacitor, a first terminal of the first resistor and a first terminal of the second capacitor. A second terminal of the first capacitor, an anode of the Zener diode and a second terminal of the third capacitor may be connected with the negative output terminal of the direct current source. A second terminal of the first resistor may be connected with a second terminal of the second capacitor, a cathode of the Zener diode and a first terminal of the second resistor. A second terminal of the second resistor may be connected with a first terminal of the third capacitor, with a connection point between the second terminal of the second resistor and the first terminal of the third capacitor being the output terminal of the voltage limiting circuit.

Preferably, the voltage limiting circuit may further include a first switching transistor. The first switching transistor may be an insulated gate bipolar transistor, a field effect transistor or a triode. An input terminal of the first switching transistor may be connected with a connection point between the cathode of the first diode, the first capacitor, the first resistor and the second capacitor. A control terminal of the first switching transistor may be connected with a connection point between the cathode of the Zener diode, the first resistor R1 and the second capacitor. An output terminal of the first switching transistor may be connected with the first terminal of the third capacitor via the second resistor.

Preferably, the driver circuit may be a driver chip or a set of discrete components which can realize Under Voltage Lock Out.

Preferably, the switching device may include a second switching transistor. The second switching transistor may be an insulated gate bipolar transistor, a field effect transistor or a triode.

Preferably, the switching device may include a second switching transistor, a first inductor and a third resistor. The first inductor may be connected in parallel with the third resistor, with a first parallel connection point between the first inductor and the third resistor being the first terminal of the switching device, and a second parallel connection point between the first inductor and the third resistor being connected with an input terminal of the second switching transistor. A control terminal of the second switching transistor may be the control terminal of the switching device. An output terminal of the second switching transistor may be the second terminal of the switching device.

Preferably, the switching device may further include a third diode. A cathode of the third diode may be connected with the first parallel connection point. An anode of the third diode may be connected with the output terminal of the second switching transistor.

Preferably, the switching device may include a second switching transistor, a third switching transistor, and a third resistor. The third switching transistor may be an insulated gate bipolar transistor, a field effect transistor, a triode or a thyristor. An input terminal of the third switching transistor may be connected with a second terminal of the third resistor. A first terminal of the third resistor may be connected with an input terminal of the second switching transistor, with a connection point between the first terminal of the third resistor and the input terminal of the second switching transistor being the first terminal of the switching device. An output terminal of the second switching transistor may be connected with an output terminal of the third switching transistor, with a connection point between the output terminal of the second switching transistor and the output terminal of the third switching transistor being the second terminal of the switching device. A control terminal of the second switching transistor and a control terminal of the third switching transistor each may be the control terminal of the switching device. The driving signals may include a first signal and a second signal. The first signal may be a signal for controlling the third switching transistor to be periodically switched on in a case that the enable signal is an OFF-ENABLE signal. The second signal may be a signal for controlling the second switching transistor to be periodically switched on when an output voltage of the direct current source falls below a preset threshold.

Preferably, the device for protecting the direct current source may further include a series circuit. The series circuit may be connected between the first terminal of the switching device and the positive output terminal of the device for protecting the direct current source. Or, the series circuit may be connected between the second terminal of the switching device and the negative output terminal of the device for protecting the direct current source. The series circuit may be configured to consume the energy stored at an input terminal of an electrical device which is connected with the output terminal of the device for protecting the direct current source in a case that the switching device is switched on. Or, the series circuit may be configured to connect the direct current source with the electrical device in a case that the switching device is switched off.

Preferably, the series circuit may include a third diode and a third resistor connected in parallel. An anode of the third diode may be connected with the connection point between the positive output terminal of the direct current source and the switching device, and a cathode of the third diode may be the positive output terminal of the device for protecting the direct current source. Or, a cathode of the third diode may be connected with the connection point between the negative output terminal of the direct current source and the switching device, and an anode of the third diode may be the negative output terminal of the device for protecting the direct current source.

Preferably, the series circuit may include a first inductor and a third resistor connected in parallel. A first connection point between the first inductor and the third resistor may be connected with the connection point between the positive output terminal of the direct current source and the switching device, and a second connection point between the first inductor and the third resistor may be the positive output terminal of the device for protecting the direct current source. Or, a first connection point between the first inductor and the third resistor may be connected with the connection point between the negative output terminal of the direct current source and the switching device, and a second connection point between the first inductor and the third resistor may be the negative output terminal of the device for protecting the direct current source.

A method for protecting a direct current source is further provided, which is applied in the device for protecting the direct current source. The method for protecting the direct current source includes storing, by a hiccup driver circuit, electric energy outputted from a direct current source, receiving, by the hiccup driver circuit, an enable signal, generating, by the hiccup driver circuit, a driving signal based on the enable signal and the electric energy stored internally, and switching on the switching device periodically based on the driving signal in a case that the enable signal is an OFF-ENABLE signal.

Preferably, the hiccup driver circuit may include a voltage limiting circuit and a driver circuit. The process of storing, by a hiccup driver circuit, electric energy outputted from a direct current source, receiving, by the hiccup driver circuit, an enable signal, and generating, by the hiccup driver circuit, a driving signal based on the enable signal and the electric energy stored internally, may include storing, by the voltage limiting circuit, the electric energy outputted from the direct current source, and generating, by the voltage limiting circuit, a supply voltage based on the electric energy stored internally, receiving, by the driver circuit, the enable signal, generating, by the driver circuit, a driving signal for controlling the switching device to be switched on and consuming the electric energy stored internally in a case that the enable signal is an OFF-ENABLE signal and the supply voltage meets a first preset condition, and generating a driving signal for controlling the switching device to be switched off in a case that the enable signal is a NON-OFF-ENABLE signal or the supply voltage meets a second preset condition.

Preferably, the first preset condition may be that the supply voltage is equal to or higher than a preset upper protection voltage limit. The second preset condition may be that the supply voltage is less than a preset lower protection voltage limit.

Preferably, the device for protecting the direct current sources may further include a series circuit. The method for protecting the direct current source may further include in the process of switching on the switching device periodically based on the driving signal, consuming, by the series circuit in a case that the switching device is switched on, the energy stored at an input terminal of an electrical device which is connected with the output terminal of the device for protecting the direct current source.

With the device for protecting the direct current source according to the present disclosure, electric energy outputted from the direct current source is stored and an enable signal is received by the hiccup drive circuit. In a case that the enable signal is an OFF-ENABLE signal, the driving signal is generated based on the electric energy stored internally. By periodically switching on the switching device based on the driving signal, the output voltage of the direct current source is periodically short-circuited. Therefore, the issue of a large conduction loss in the conventional art is avoided, which is caused by the fact that a minimum required voltage for driving the electronic switch is required to be continuously provided by the output voltage of the direct current source.

BRIEF DESCRIPTION OF THE DRAWINGS

In order to illustrate technical solutions in embodiments of the present disclosure or in the conventional technology more clearly, drawings used in the description of the embodiments or the conventional technology are introduced briefly hereinafter. Apparently, the drawings described hereinafter merely illustrate some embodiments of the present disclosure, and other drawings may be obtained by those skilled in the art based on these drawings without any creative efforts.

DETAILED DESCRIPTION OF THE EMBODIMENTS

For a better understanding of the object, technical solutions and advantages of the present disclosure, the present disclosure is further described in detail in conjunction with drawings and embodiments.

In order to address the above technical issue of a large conduction loss in the conventional art, a device for protecting a direct current (DC) source is provided according to the present disclosure.

Figure 1:
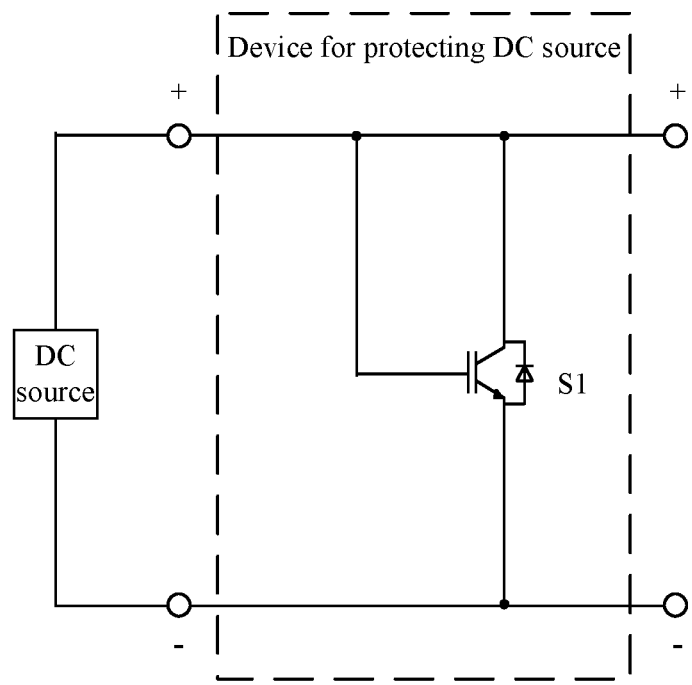
FIG. 1 is a schematic circuit diagram of a device for protecting a direct current source in the conventional art.
Figure 2:
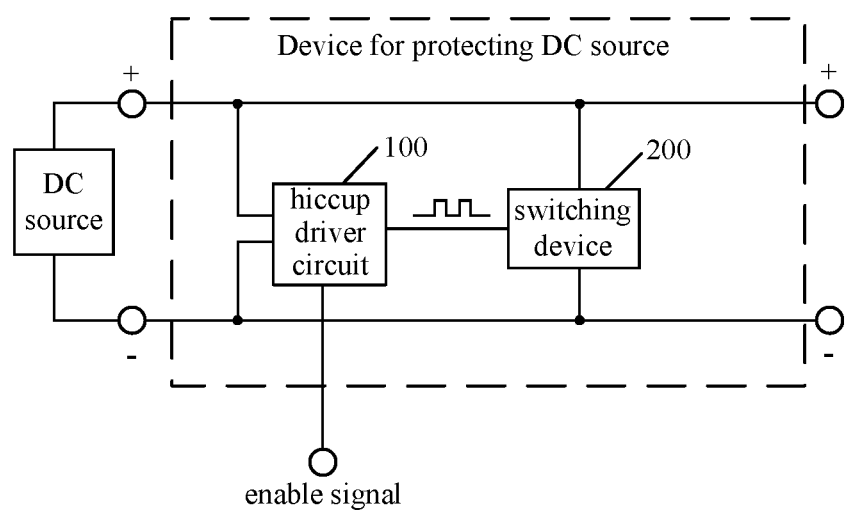
FIG. 2 is a schematic structural diagram of a device for protecting a direct current source according to an embodiment of the present disclosure.

As shown in FIG. 2, the device for protecting the DC source includes a hiccup driver circuit 100 and a switching device 200. Power supply terminals of the hiccup driver circuit 100 are connected with a positive output terminal and a negative output terminal of the DC source respectively. An input terminal of the hiccup driver circuit 100 receives an enable signal. A control terminal of the switching device 200 is connected with an output terminal of the hiccup driver circuit 100. A first terminal of the switching device 200 is connected with the positive output terminal of the DC source, with a connection point between the first terminal of the switching device and the positive output terminal of the DC source being a positive output terminal of the device for protecting the DC source. A second terminal of the switching device 200 is connected with the negative output terminal of the DC source, with a connection point between the second terminal of the switching device and the negative output terminal of the DC source being a negative output terminal of the device for protecting the DC source.

The specific working principal is as follows.

The hiccup driver circuit 100 gets power supply from the output terminal of the DC source, stores the electric energy outputted from the DC source and receives the enable signal. In a case that the enable signal is an OFF-ENABLE signal, the device for protecting the DC source is in a protection state. The hiccup driver circuit 100 generates and outputs a driving signal based on the electric energy stored internally. The switching device 200 is controlled by the driving signal to function to short-circuit the output terminal of the DC resource, and hence an output voltage of the DC source is limited to a safe range.

Since power supply cannot be effectively provided for the hiccup drive circuit 100 after the output terminal of the DC source is short-circuited, the hiccup drive circuit 100 continues to operate using the electric energy stored internally in advance. The switching device 100 is not switched off by the hiccup drive circuit 200 until the electric energy stored is insufficient to drive the switch device 200. After that, the output voltage of the DC source will rise and continue to supply power to the hiccup drive circuit 100. The hiccup drive circuit 100 also limits a rising rate of the output voltage of the DC source when storing the energy. The switch device 200 is not switched on again until sufficient electric energy is stored by the hiccup drive circuit 100. The output terminal of the DC source is short-circuited again. By cycling the above steps, a periodically switching on of the switching device 200 is realized, and hence the output voltage of the DC source is periodically short-circuited and controlled to be within a safe range.

If the enable signal of the device for protecting the DC source is a NON-OFF-ENABLE signal, i.e. the device is invalid, the hiccup drive circuit 100 will turn off the switching device 200, and thus the DC source normally output a voltage.

With the device for protecting the DC source according to this embodiment, by periodically switching on the switching device 200 based on the above process, the output voltage of the DC source is periodically short-circuited. Therefore, the issue of a large conduction loss in the conventional art is avoided, which is caused by the fact that a minimum required voltage for driving the electronic switch is required to be continuously provided by the output voltage of the DC source.

In addition, in practice, the DC source may be a single photovoltaic module or a set of photovoltaic modules connected in series or in parallel, and may be other DC sources for which an output protection can be implemented by short-circuiting. An electrical device connected with the output terminal of the device for protecting the DC source may be an inverter or other devices. These are not specifically limited herein. Any device for protecting the DC source, which is capable of making the DC source enter into the safe mode by the above-mentioned principle, falls within the scope protection of the present disclosure.

Figure 3:
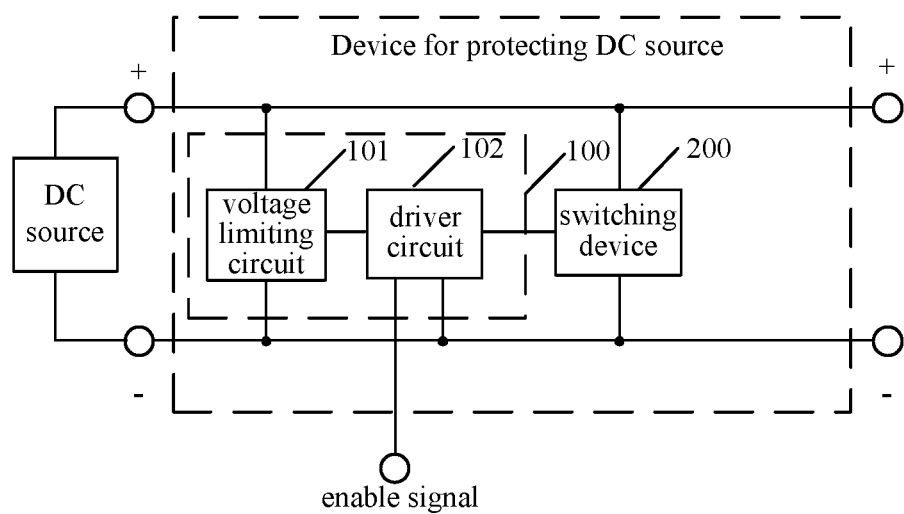
FIG. 3 is a schematic structural diagram of a device for protecting a direct current source according to another embodiment of the present disclosure.

In another embodiment, based on FIG. 2, the hiccup driver circuit 100 includes a voltage limiting circuit 101 and a driver circuit 102, as shown in FIG. 3.

Input terminals of the voltage limiting circuit 102 are the power supply terminals of the hiccup driver circuit 100. A first input terminal of the driver circuit 102 is the input terminal of the hiccup driver circuit 100. A second input terminal of the driver circuit 102 is connected with an output terminal of the voltage limiting circuit 101. A third input terminal of the driver circuit 102 is connected with the negative output terminal of the DC source. An output terminal of the driver circuit 102 is the output terminal of the hiccup driver circuit 100.

The voltage limiting circuit 101 is configured to store the electric energy outputted from the DC source and generate a supply voltage based on the electric energy stored internally. The driver circuit 102 is configured to receive the enable signal, generate a driving signal for controlling the switching device to be switched on 200 and consume the electric energy stored internally, in a case that the enable signal is an OFF-ENABLE signal and the supply voltage meets a first preset condition, and generate a driving signal for controlling the switching device to be switched off 200 in a case that the enable signal is a NON-OFF-ENABLE signal or the supply voltage meets a second preset condition.

Figure 4:
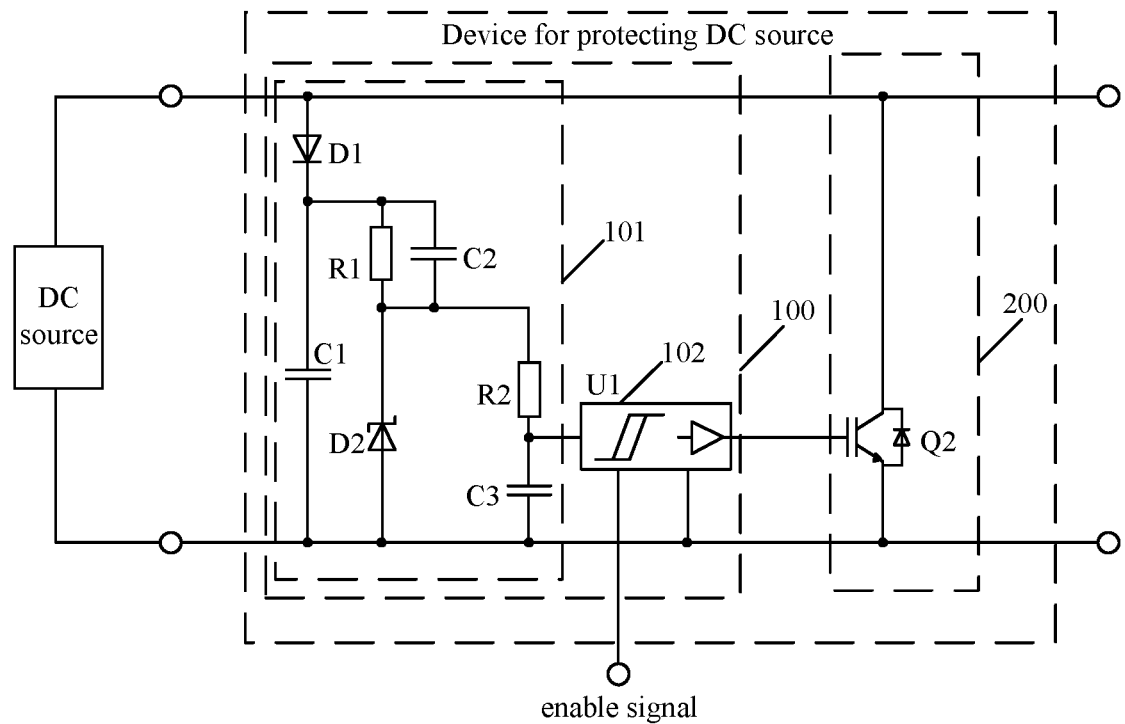
FIG. 4 is a schematic circuit diagram of a device for protecting a direct current source according to another embodiment of the present disclosure.

Preferably, as shown in FIG. 4, the voltage limiting circuit 101 includes a first diode D1, a first capacitor C1, a first resistor R1, a Zener diode D2, a second capacitor C2, a second resistor R2 and a third capacitor C3. An anode of the first diode D1 is connected with the positive output terminal of the DC source. A cathode of the first diode D1 is connected with a first terminal of the first capacitor C1, a first terminal of the first resistor R1 and a first terminal of the second capacitor C2. A second terminal of the first capacitor C1, an anode of the Zener diode D2 and a second terminal of the third capacitor C3 are connected with the negative output terminal of the DC source. A second terminal of the first resistor R1 is connected with a second terminal of the second capacitor C2, a cathode of the Zener diode D2 and a first terminal of the second resistor R2. A second terminal of the second resistor R2 is connected with a first terminal of the third capacitor C3, with a connection point between the second terminal of the second resistor and the first terminal of the third capacitor being the output terminal of the voltage limiting circuit.

Figure 5:
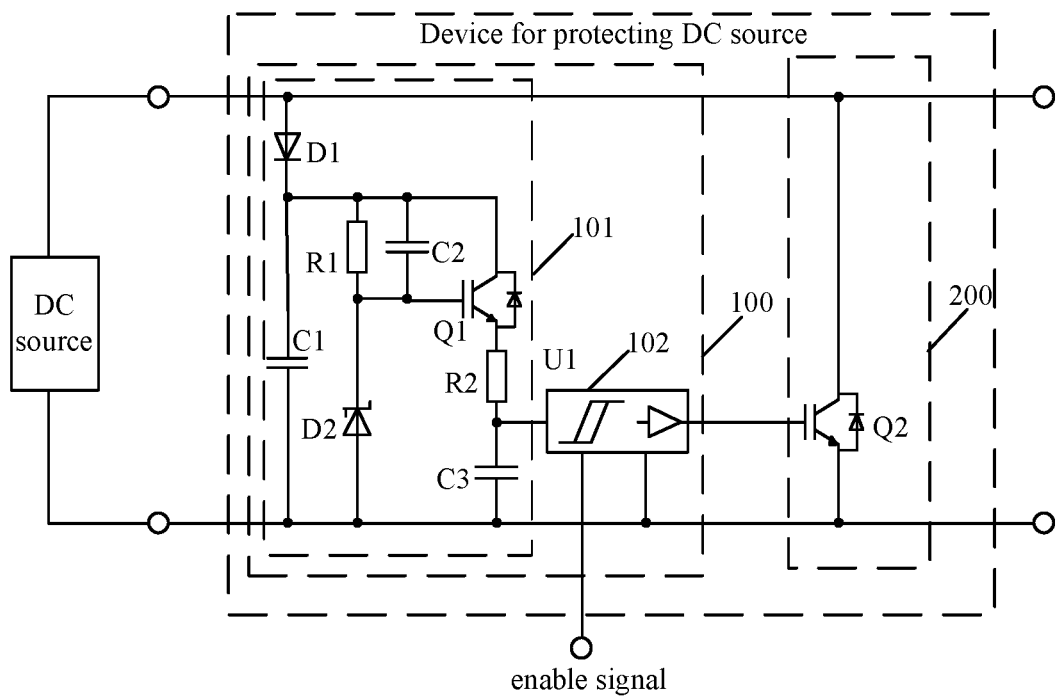
FIG. 5 is a schematic circuit diagram of a device for protecting a direct current source according to another embodiment of the present disclosure.

Optionally, based on FIG. 4, the voltage limiting circuit further includes a first switching transistor Q1, as shown in FIG. 5. The first switching transistor Q1 is an insulated gate bipolar transistor, a field effect transistor or a triode. In a specific implementation, the first switching transistor Q1 may also be other electronic switches, which are not specifically limited herein and fall into the scope of this application. An input terminal of the first switching transistor Q1 is connected with a connection point between the cathode of the first diode D1, the first capacitor C1, the first resistor R1 and the second capacitor C2. A control terminal of the first switching transistor Q1 is connected with a connection point between the cathode of the Zener diode D2, the first resistor R1 and the second capacitor C2. An output terminal of the first switching transistor Q1 is connected with the first terminal of the third capacitor C3 via the second resistor R2.

Preferably, as shown in FIG. 4 or FIG. 5, the driver circuit 102 is a driver chip U1 which can realize Under Voltage Lock Out (UVLO), or is a set of discrete components with a UVLO function in a specific implementation. It is not limited by this application and can be determined by the application environment.

As shown in FIG. 4 or FIG. 5, the switching device 200 may include a second switching transistor Q2. The second switching transistor Q2 is an insulated gate bipolar transistor, a field effect transistor or a triode. In a specific implementation, the second switching transistor Q1 may also be other electronic switches, which are not specifically limited herein and fall into the scope of this application.

Figure 6:
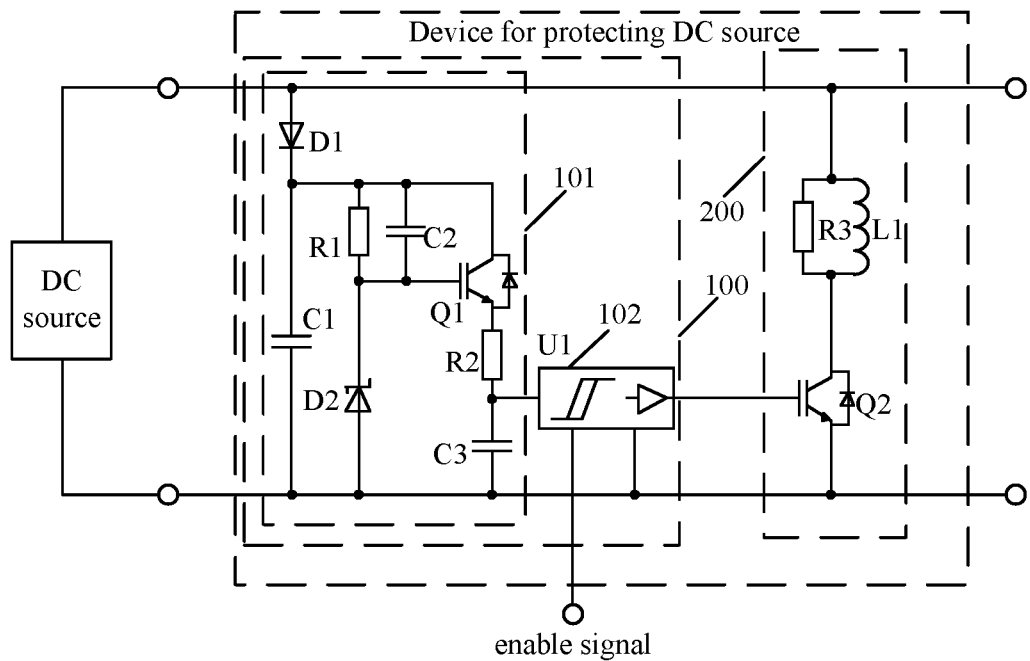
FIG. 6 is a schematic circuit diagram of a device for protecting a direct current source according to another embodiment of the present disclosure.

Alternatively, as shown in FIG. 6, the switching device 200 includes a second switching transistor Q2, a first inductor L1 and a third resistor R3. The first inductor L1 is connected in parallel with the third resistor R3, with a first parallel connection point between the first inductor L1 and the third resistor R3 being the first terminal of the switching device, and a second parallel connection point between the first inductor L1 and the third resistor R3 being connected with an input terminal of the second switching transistor Q2. A control terminal of the second switching transistor Q2 is the control terminal of the switching device. An output terminal of the second switching transistor Q2 is the second terminal of the switching device.

Figure 7:
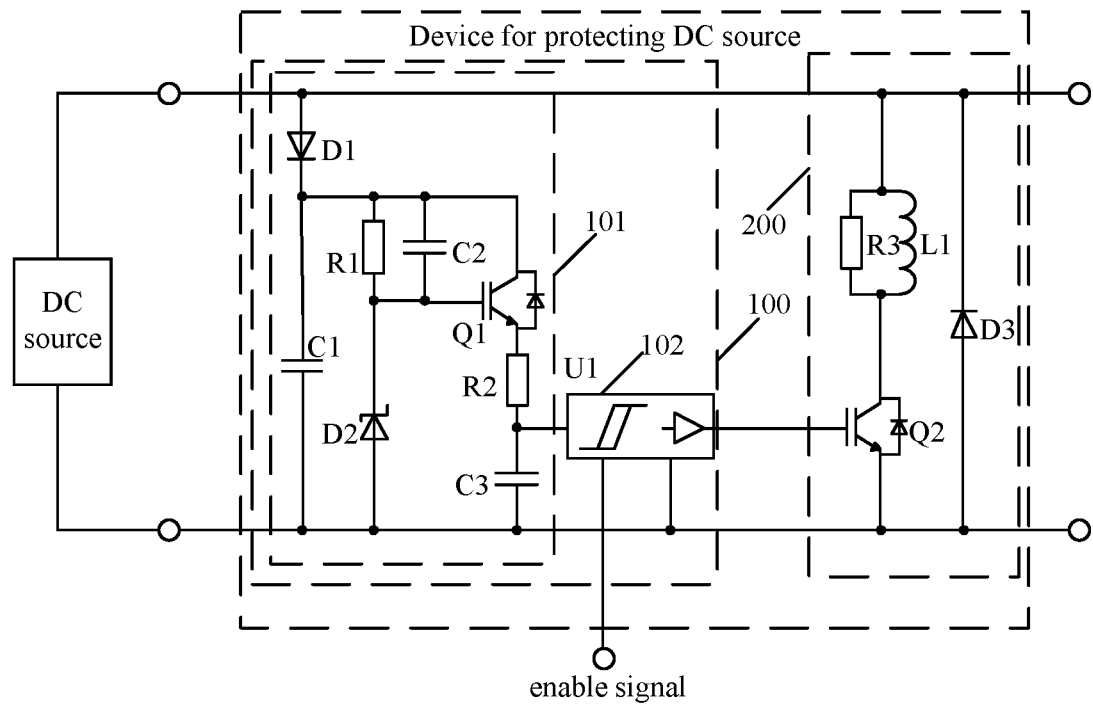
FIG. 7 is a schematic circuit diagram of a device for protecting a direct current source according to another embodiment of the present disclosure.

Alternatively, based on FIG. 6, the switching device 200 further includes a third diode D3, as shown in FIG. 7. A cathode of the third diode D3 is connected with the first parallel connection point. An anode of the third diode D3 is connected with the output terminal of the second switching transistor Q2.

Figure 8:
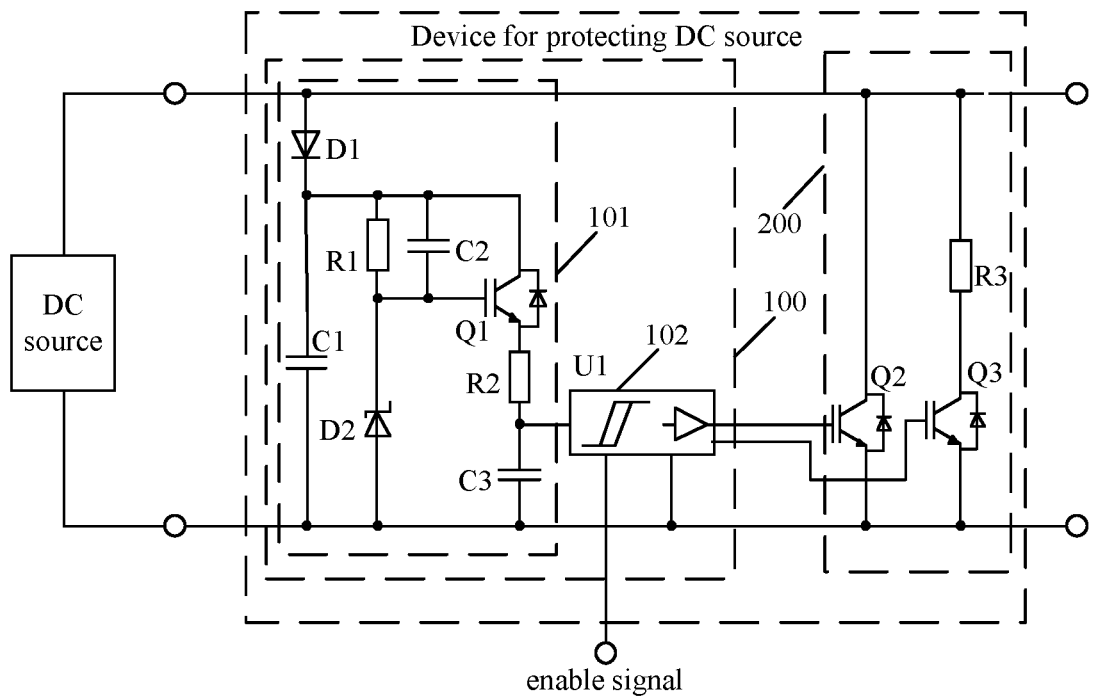
FIG. 8 is a schematic circuit diagram of a device for protecting a direct current source according to another embodiment of the present disclosure.

Alternatively, as shown in FIG. 8, the switching device 200 includes a second switching transistor Q2, a third switching transistor Q3, and a third resistor R3. The third switching transistor Q3 is an insulated gate bipolar transistor, a field effect transistor, a triode or a thyristor. In a specific implementation, the third switching transistor Q3 may also be other electronic switches, which are not specifically limited herein and fall into the scope of this application. An input terminal of the third switching transistor Q3 is connected with a second terminal of the third resistor R3. A first terminal of the third resistor R3 is connected with an input terminal of the second switching transistor Q2, with a connection point between the first terminal of the third resistor and the input terminal of the second switching transistor being the first terminal of the switching device. An output terminal of the second switching transistor Q2 is connected with an output terminal of the third switching transistor Q3, with a connection point between the output terminal of the second switching transistor and the output terminal of the third switching transistor being the second terminal of the switching device. A control terminal of the second switching transistor Q2 and a control terminal of the third switching transistor Q3 each are the control terminal of the switching device. The driving signal includes a first signal and a second signal. The first signal is a signal for controlling the third switching transistor Q3 to be periodically switched on in a case that the enable signal is an OFF-ENABLE signal; and the second signal is a signal for controlling the second switching transistor Q2 to be periodically switched on when an output voltage of the DC source falls below a preset threshold.

In a specific application, at the moment that the output terminal of the DC source is short-circuited, the third switch tube Q3 may be controlled to be switched on by the first signal outputted from the hiccup drive circuit 100. The output voltage of the device for protecting a DC source is gradually decreased. When the output voltage of the DC source falls below the preset threshold, the second switch tube Q2 is controlled to be switched on by the second signal. In this manner, the current withstood by the second switch tube Q2 at the moment that the second switch tube Q2 is switched on can be greatly reduced.

In a case that no device is provided between the DC source and the electrical device connected to the output terminal of the device for protecting the DC source, and the DC source is connected with the electrical device via a wire, efficiency loss in a normal operation state without protection is low, and hence efficiency of the entire device is high.

It should be noted that the voltage limiting circuit 101 as shown in FIG. 3 may be any circuit which is configured to limit voltage. FIG. 4 and FIG. 5 are only to illustrate some of the voltage limiting method. In a practical implementation, a Zener diode and a resistor may be utilized to limit voltage (which is also called voltage regulation). Alternatively, a switching power supply or other linear power supply may be utilized to limit voltage. Any voltage limiting circuit, which is capable of limiting the supply voltage to a normal range, falls within the scope of protection of the present disclosure, which is not specifically limited herein. The driving circuit 102 as shown in FIG. 3 may be an insulated gate bipolar transistor, a field effect transistor or a triode driver chip. Alternatively, a discrete component may be utilized to realize a similar function. Each of the electronic switches may be an insulated gate bipolar transistor, a triode, a field effect transistor or other semiconductor device, which is not specifically limited herein and falls into the scope of this application.

Figure 9:
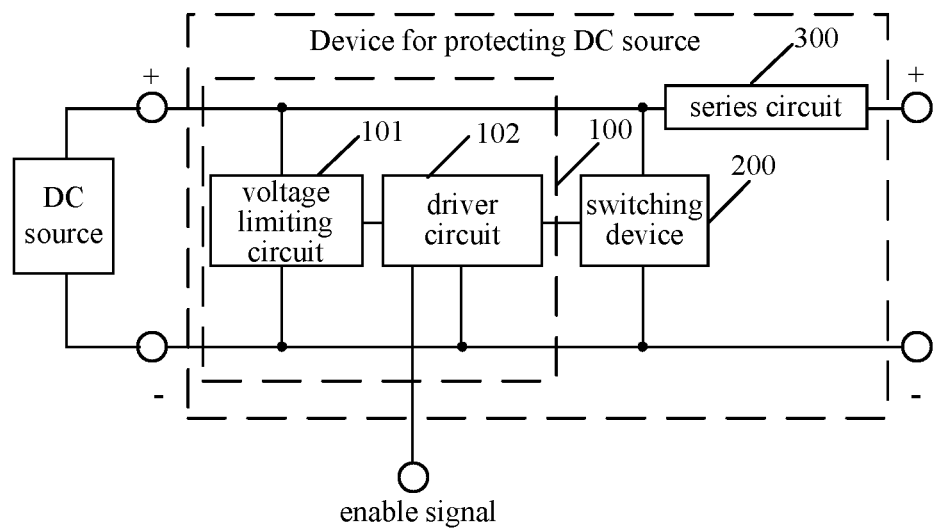
FIG. 9 is a schematic circuit diagram of a device for protecting a direct current source according to another embodiment of the present disclosure.

As shown in FIG. 9, in another embodiment of the present disclosure, the device for protecting the DC source further includes a series circuit 300. The series circuit 300 is connected between the first terminal of the switching device 200 and the positive output terminal of the device for protecting the DC source, as shown in FIG. 9. Alternatively, the series circuit 300 is connected between the second terminal of the switching device 200 and the negative output terminal of the device for protecting a DC source, which is not shown in figure. The series circuit 300 is configured to consume the energy stored at an input terminal of an electrical device which is connected with the output terminal of the device for protecting the DC source in a case that the switching device 200 is switched on. Alternatively, the series circuit 300 is configured to connect the DC source and the electrical device in a case that the switching device 200 is switched off.

Figure 10:
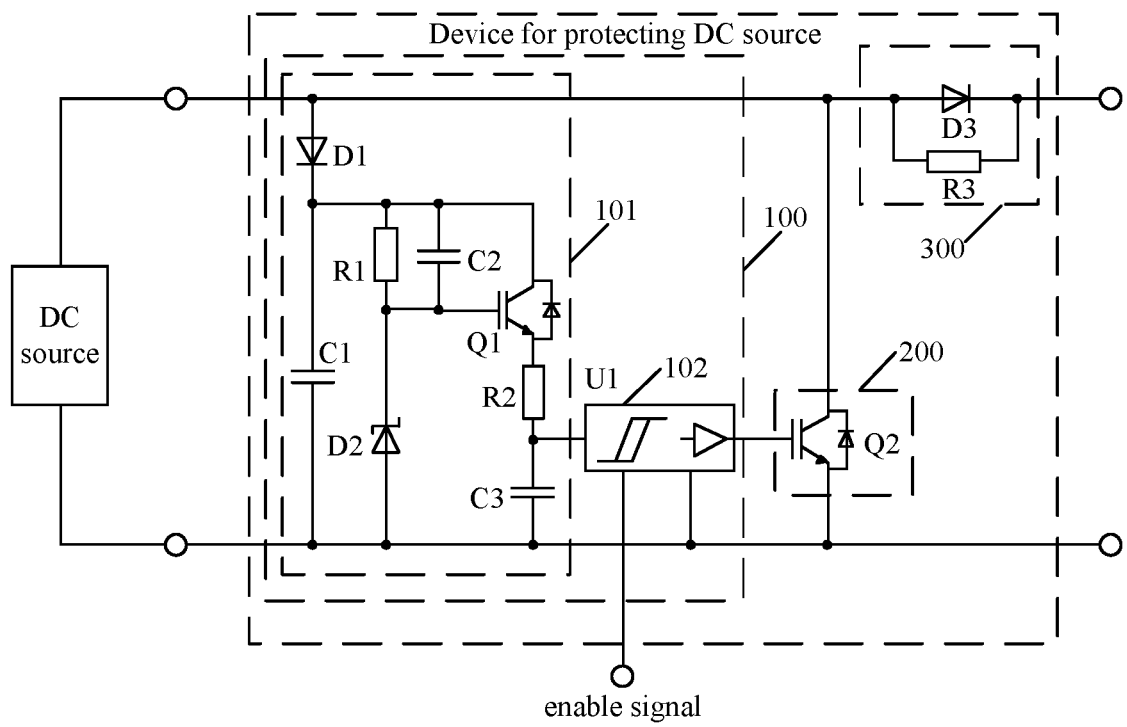
FIG. 10 is a schematic circuit diagram of a device for protecting a direct current source according to another embodiment of the present disclosure.
Figure 11:
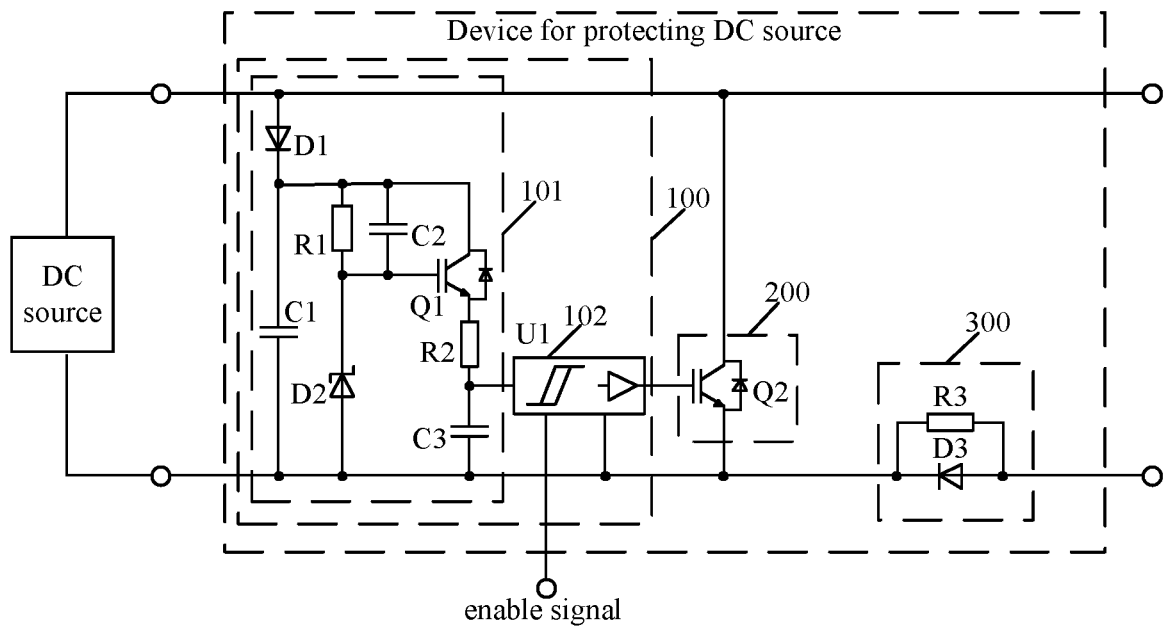
FIG. 11 is a schematic circuit diagram of a device for protecting a direct current source according to another embodiment of the present disclosure.

As shown in FIG. 10 and FIG. 11, the series circuit 300 includes a third diode D3 and a third resistor R3 which are connected in parallel. An anode of the third diode D3 is connected with the connection point between the positive output terminal of the DC source and the switching device 200, and a cathode of the third diode D3 is the positive output terminal of the device for protecting the DC source, as shown in FIG. 10. Alternatively, a cathode of the third diode D3 is connected with the connection point between the negative output terminal of the DC source and the switching device 200, and an anode of the third diode D3 is the negative output terminal of the device for protecting the DC source, as shown in FIG. 11.

Figure 12:
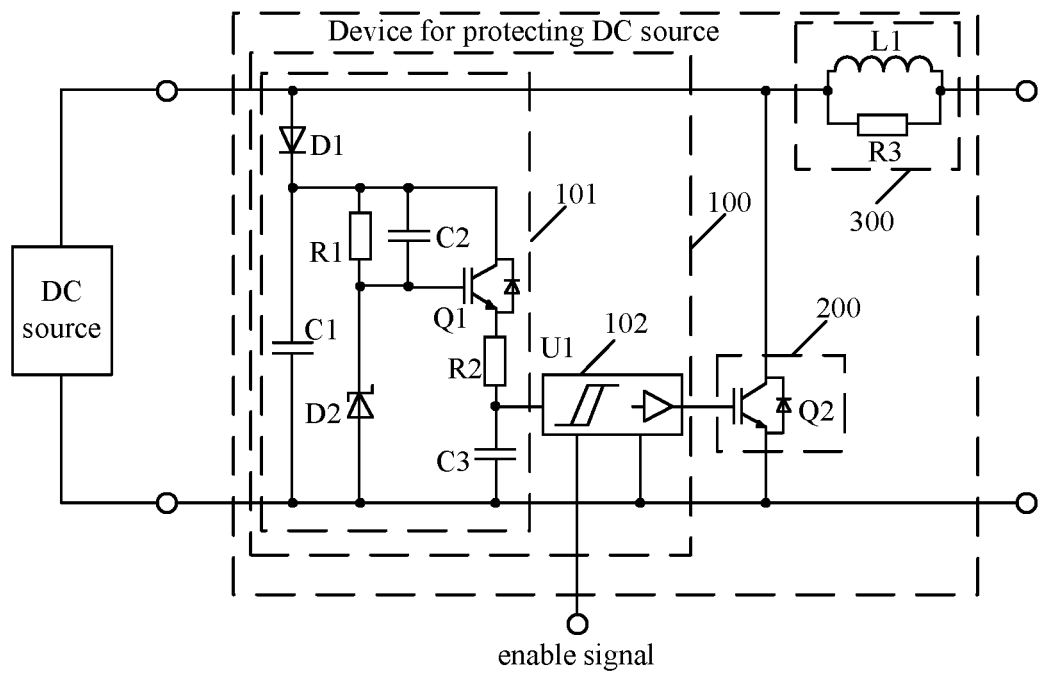
FIG. 12 is a schematic circuit diagram of a device for protecting a direct current source according to another embodiment of the present disclosure.
Figure 13:
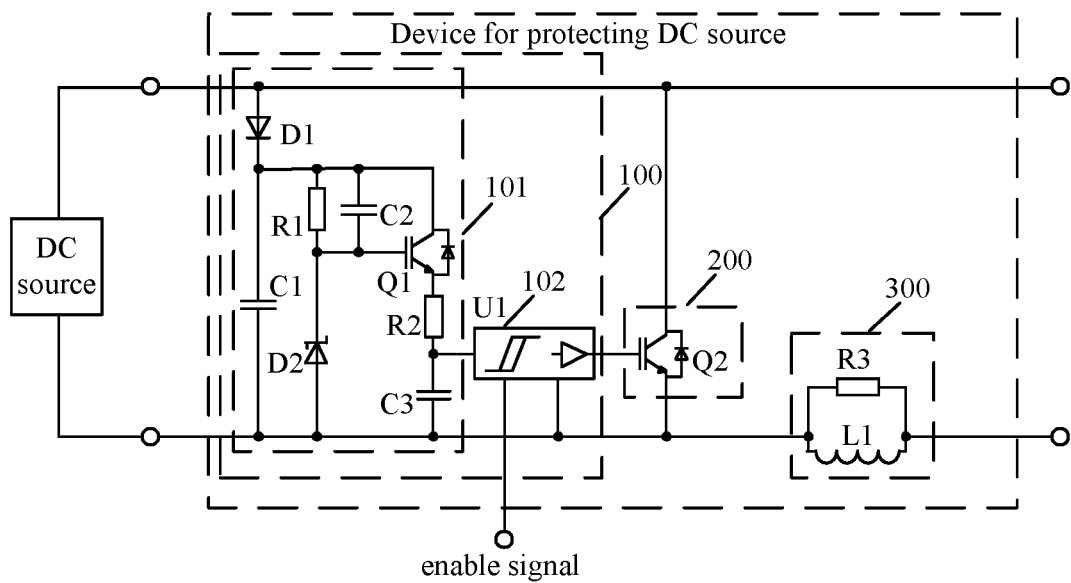
FIG. 13 is a schematic circuit diagram of a device for protecting a direct current source according to another embodiment of the present disclosure.

Alternatively, as shown in FIG. 12 and FIG. 13, the series circuit 300 includes a first inductor L1 and a third resistor R3 connected in parallel. A first connection point between the first inductor L1 and the third resistor R3 is connected with the connection point between the negative output terminal of the DC source and the switching device 200, and a second connection point between the first inductor L1 and the third resistor R3 is the positive output terminal of the device for protecting a DC source, as shown in FIG. 12. Alternatively, a first connection point between the first inductor L1 and the third resistor R3 is connected with the connection point between the negative output terminal of the DC source and the switching device, and a second connection point between the first inductor L1 and the third resistor R3 is the negative output terminal of the device for protecting the DC source, as shown in FIG. 13.

In the device for protecting the DC source as shown in FIGS. 2 to 8, no device is provided between the DC source and the electrical device connected to the output terminal of the device for protecting the DC source, and the DC source is connected with the electrical device via a wire. Efficiency loss in a normal operation state without protection is low, and hence efficiency of the entire device is high. However, at the moment that the output of the DC source is short-circuited, the switching device 200 may withstand a large current. Therefore the switching device 200 should have a capability of withstanding the large current.

In the device for protecting the DC source as shown in FIGS. 9 to 13, the energy stored in a capacitor at the input terminal of the electrical device may be consumed by the series circuit 300. At the moment that the switching device 200 is switched on, the current withstood by the switching device 200 can be reduced. In addition, in a case that the switch device 200 is switched off, the DC source and the electrical device may be connected to ensure that the electrical device can be in a normal operation.

FIGS. 10 to 13 are only for illustration and do not represent a relationship between the specific implementation of the voltage limiting circuit 101, the driving circuit 102 and the switching device 200, and the connection mode of the series circuit 300. The relationship is not limited by what is shown in FIGS. 10 to 13. A combination of FIGS. 4 to 8 and FIGS. 10 to 13 falls within the scope of protection of the present disclosure, which is not be described herein.

FIG. 10 is taken as an example for illustration.

In a normal case, the enable signal is a NON-OFF-ENABLE signal. In this case, the DC source is normally supplies power to the electrical device through the third diode D3 and the third resistor R3. Since the current flowing through the third resistor R3 is generally much smaller than that flowing through the third diode D3, it can be considered that the third diode D3 provides a current path in this case. The first capacitor C1 is charged by the output voltage of the DC source through the first diode D1, and hence the voltage of the first capacitor C1 is close to the output voltage of the DC source finally.

Also, the first resistor R1, the second capacitor C2, the second diode D2, and the first switch Q1 limit the maximum input voltage of the driver chip U1. In this case, although the maximum input voltage is within the normal voltage range of the driver chip U1, the driver chip U1 outputs a low level and the second switching transistor Q2 is switched off since the enable signal is a NON-OFF-ENABLE signal.

If the enable signal is an OFF-ENABLE signal when the DC source is to be short-circuited. In this case, if the output voltage of the DC source is higher than a preset voltage Us (Us<required voltage), the voltage limiting circuit 101 outputs a supply voltage that meets a first preset condition (e.g., being higher than the preset upper protection voltage limit UH) to the driver chip U1. Since the supply voltage of the driver chip U1 is within a normal operating range, a high level is outputted. The second switching transistor Q2 is switched on, and hence the DC source is short-circuited immediately. During the short-circuited period, the first diode D1 and the third diode D3 are reversely cut off, the first capacitor C1 continues to supply power to the driver chip U1 through the first switch Q1. The output voltage of the DC source is maintained in a low range while the voltage of the first capacitor C1 is lowered. The capacitor at the input terminal of the electrical device is slowly discharged through the third resistor R3, and the voltage is gradually lowered.

The output voltage of the DC source is limited to a low value after the DC source is short-circuited, and the driver chip U1 is powered by the first capacitor C1 and the third capacitor C3 in the voltage limiting circuit 101. When the voltage of the first capacitor C1 is lowered to a certain value, the voltage of the third capacitor C3 meets the second preset condition (for example, being lower than a preset lower protection voltage limit UL of the driver chip U1). The driver chip U1 outputs a low level and the second switching transistor Q2 is switched off.

After the second switch Q2 is switched off, the output voltage of the DC source rises. In this case, the first capacitor C1 is charged by the DC source through the first diode D1. The electrical device is powered by the DC source through the third diode D3 and the third resistor R3. The rising rate of the output voltage of the DC source is limited, until the first capacitor C1 is charged to a certain voltage value. In this case, the voltage of the third capacitor C3 is greater than the preset upper protection voltage limit UH of the driver chip U1. The first preset condition is satisfied again, and the above processes are repeated. Finally, the output voltage of the DC source is periodically short-circuited, and the DC source enters into a safe mode. When the second switch tube Q2 is switched off, the output voltage of the DC source supplies power to the relevant portion of the voltage limiting circuit 101, and makes preparation for a next switching on of the second switching transistor Q2.

In a case that the enable signal changes into a signal which is a NON-OFF-ENABLE signal at any time, the driver chip U1 outputs a low level and the second switching transistor Q2 is switched off. The output voltage of the DC source is normally outputted.

Figure 14:
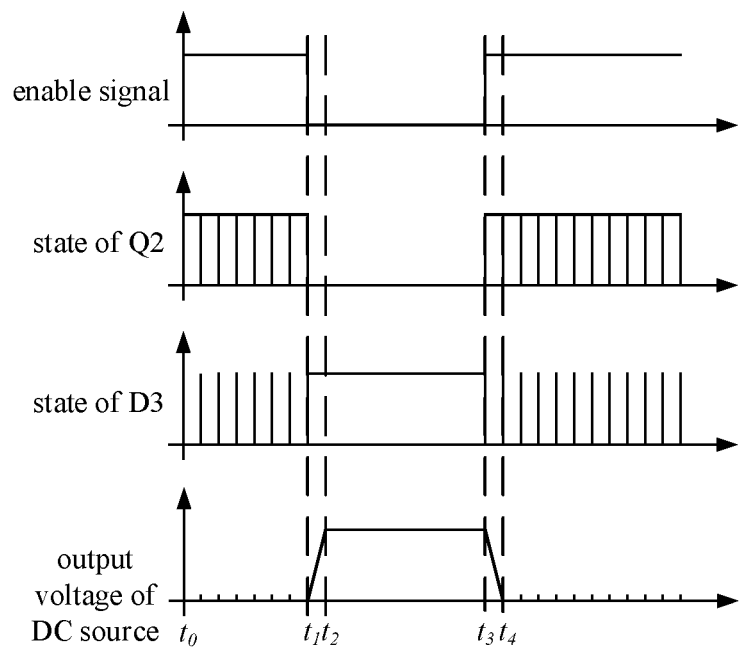
FIG. 14 is a signal timing diagram of a device for protecting a direct current source according to another embodiment of the present disclosure.

FIG. 14 is a corresponding signal timing diagram. From t0 to t1, the enable signal is 1, i.e., an OFF-ENABLE signal. The second switching transistor Q2 and the third diode D3 are alternately switched on. The output voltage of the DC source is maintained within a safe voltage range. From t1 to t2, the enable signal is 0, i.e., a NON-OFF-ENABLE signal. The second switching transistor Q2 is switched off and the third diode D3 is switched on. The output voltage of the DC source is slowly increased. From t2 to t3, the output voltage of the DC source is unchanged. From t3 to t4, the enable signal is 1, i.e., an OFF-ENABLE signal. The second switching transistor Q2 is switched on and the third diode D3 is reversely cut off. The output voltage of the DC source starts to be attenuated by the third resistor R3.

The principles in FIGS. 4 to 8, FIG. 11, FIG. 12 and FIG. 13 are similar to those described above, which are not described herein.

Figure 15:
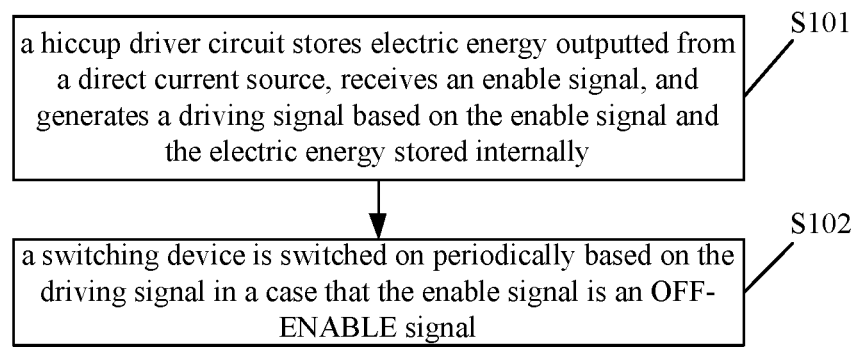
FIG. 15 is a flowchart of a method for protecting a direct current source according to an embodiment of the present disclosure.

As shown In FIG. 15, in another embodiment of the present disclosure, a method for protecting a DC source is provided, which is applied in the device for protecting a DC source as shown in FIG. 2. The method for protecting the DC source includes steps S101 and S102.

In step S101, a hiccup driver circuit stores electric energy outputted from a DC source, receives an enable signal, and generates a driving signal based on the enable signal and the electric energy stored internally.

In step S102, the switching device is switched on periodically based on the driving signal in a case that the enable signal is an OFF-ENABLE signal.

With the method for protecting the DC source according to this embodiment, by periodically switching on the switching device 200 based on the above process, the output voltage of the DC source is periodically short-circuited. Therefore, the issue of a large conduction loss in the conventional art is avoided, which is caused by the fact that a minimum required voltage for driving the electronic switch is required to be continuously provided by the output voltage of the DC source.

Figure 16:
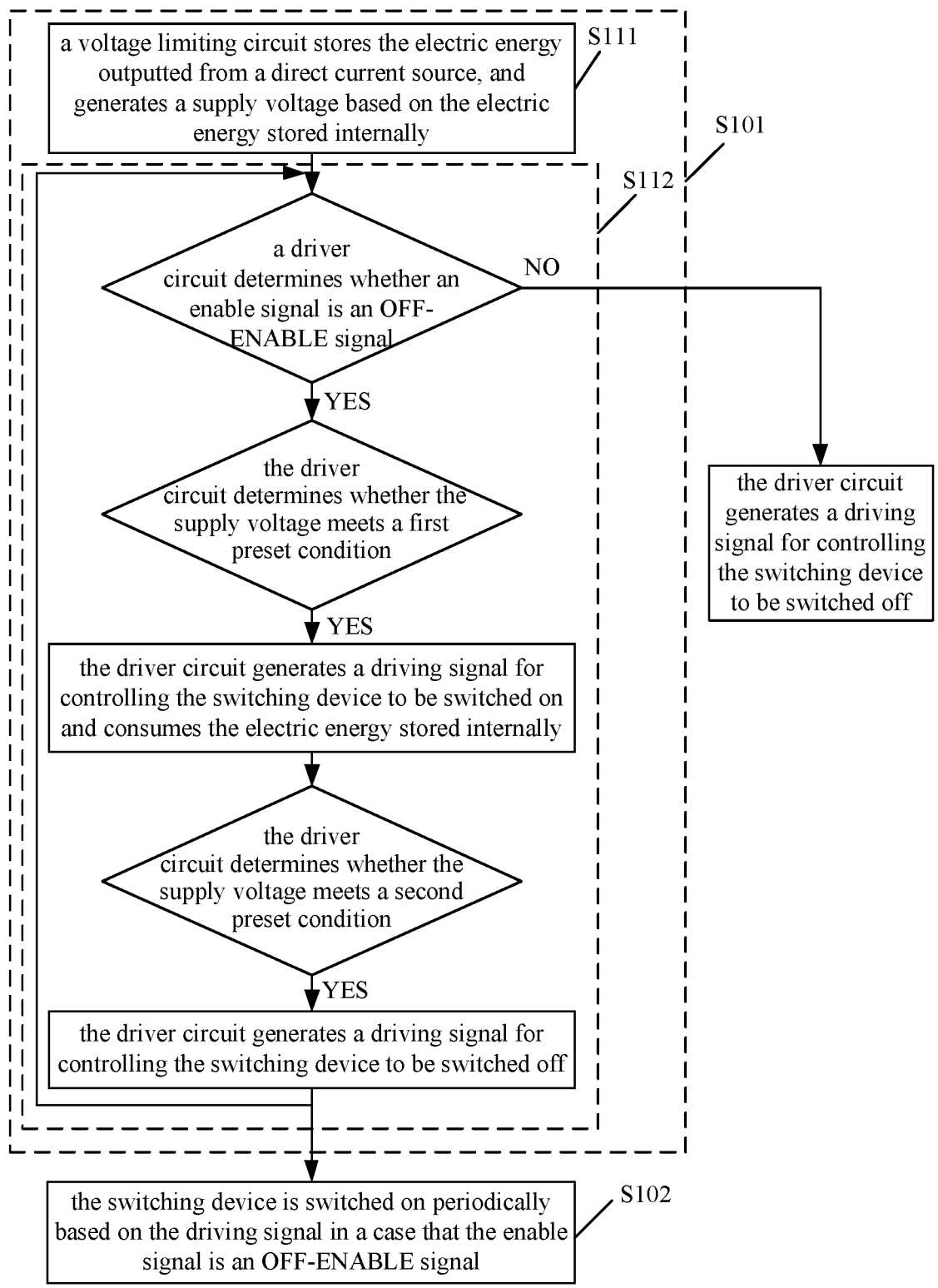
FIG. 16 is a flowchart of a method for protecting a direct current source according to another embodiment of the present disclosure.

Preferably, the hiccup driver circuit includes a voltage limiting circuit and a driver circuit. As shown in FIG. 16, step S101 includes steps S111 and S112.

In step S111, the voltage limiting circuit stores the electric energy outputted from the DC source, and generates a supply voltage based on the electric energy stored internally.

In step S112, the driver circuit receives the enable signal, the driver circuit generates a driving signal for controlling the switching device to be switched on and consumes the electric energy stored internally in a case that the enable signal is an OFF-ENABLE signal and the supply voltage meets a first preset condition, and the driver circuit generates a driving signal for controlling the switching device to be switched off in a case that the enable signal is a NON-OFF-ENABLE signal or the supply voltage meets a second preset condition.

Preferably, the first preset condition is that the supply voltage is equal to or higher than a preset upper protection voltage limit, and the second preset condition is that the supply voltage is less than a preset lower protection voltage limit.

Figure 17:
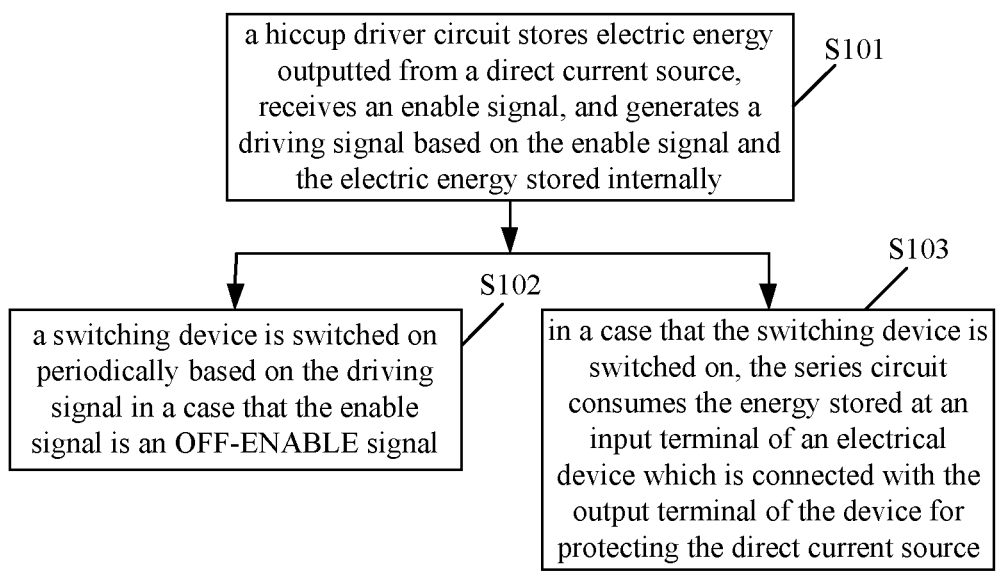
FIG. 17 is a flowchart of a method for protecting a direct current source according to another embodiment of the present disclosure.

Preferably, the device for protecting the DC sources further includes a series circuit. And the method for protecting the DC source further includes a step S103 which will be executed at a same time as step S102, as shown in FIG. 17.

In step 103, in a case that the switching device is switched on, the energy stored at an input terminal of an electrical device which is connected with the output terminal of the device for protecting a DC source is consumed by the series circuit.

Details for the specific work principle which are the same as described above are not described herein.

The above descriptions are only preferred embodiments of the present disclosure and are not to limit the present disclosure. Various changes to the embodiments are obvious to those skilled in the art, and general principles defined herein may be implemented in other embodiments without departing from the spirit or scope of the present disclosure. Any changes, equivalents and modifications which are made within the spirit and principle of the present disclosure shall fall within the protection scope of the present disclosure.

The invention claimed is:

1. A device for protecting a direct current source, comprising a hiccup driver circuit and a switching device, wherein
power supply terminals of the hiccup driver circuit are connected with a positive output terminal and a negative output terminal of the direct current source respectively;
an input terminal of the hiccup driver circuit receives an enable signal;
the hiccup driver circuit is configured to store electric energy outputted from the direct current source, receive the enable signal, and generate a driving signal based on the enable signal and the electric energy stored internally;
a control terminal of the switching device is connected with an output terminal of the hiccup driver circuit;
a first terminal of the switching device is connected with the positive output terminal of the direct current source, with a connection point between the first terminal of the switching device and the positive output terminal of the direct current source being a positive output terminal of the device for protecting the direct current source;
a second terminal of the switching device is connected with the negative output terminal of the direct current source, with a connection point between the second terminal of the switching device and the negative output terminal of the direct current source being a negative output terminal of the device for protecting the direct current source; and
the switching device is configured to be periodically switched on according to the driving signal in a case that the enable signal is an OFF-ENABLE signal, and
wherein the hiccup driver circuit comprises a voltage limiting circuit and a driver circuit,
input terminals of the voltage limiting circuit are the power supply terminals of the hiccup driver circuit,
the voltage limiting circuit is configured to store the electric energy outputted from the direct current source and generate a supply voltage based on the electric energy stored internally,
a first input terminal of the driver circuit is the input terminal of the hiccup driver circuit,
a second input terminal of the driver circuit is connected with an output terminal of the voltage limiting circuit,
a third input terminal of the driver circuit is connected with the negative output terminal of the direct current source,
an output terminal of the driver circuit is the output terminal of the hiccup driver circuit,
the driver circuit is configured to:
receive the enable signal,
generate a driving signal for controlling the switching device to be switched on and consume the electric energy stored internally, in a case that the enable signal is an OFF-ENABLE signal and the supply voltage meets a first preset condition, and
generate a driving signal for controlling the switching device to be switched off in a case that the enable signal is a NON-OFF-ENABLE signal or the supply voltage meets a second preset condition, and
wherein the voltage limiting circuit comprises a first diode, a first capacitor, a first resistor, a Zener diode, a second capacitor, a second resistor and a third capacitor, wherein
an anode of the first diode is connected with the positive output terminal of the direct current source,
a cathode of the first diode is connected with a first terminal of the first capacitor, a first terminal of the first resistor and a first terminal of the second capacitor,
a second terminal of the first capacitor, an anode of the Zener diode and a second terminal of the third capacitor are connected with the negative output terminal of the direct current source,
a second terminal of the first resistor is connected with a second terminal of the second capacitor, a cathode of the Zener diode and a first terminal of the second resistor, and
a second terminal of the second resistor is connected with a first terminal of the third capacitor, with a connection point between the second terminal of the second resistor and the first terminal of the third capacitor being the output terminal of the voltage limiting circuit.

2. The device for protecting the direct current source according to claim 1, wherein the voltage limiting circuit further comprises a first switching transistor, and the first switching transistor is an insulated gate bipolar transistor, a field effect transistor or a triode, wherein
an input terminal of the first switching transistor is connected with a connection point between the cathode of the first diode, the first capacitor, the first resistor and the second capacitor,
a control terminal of the first switching transistor is connected with a connection point between the cathode of the Zener diode, the first resistor and the second capacitor, and
an output terminal of the first switching transistor is connected with the first terminal of the third capacitor via the second resistor.

3. The device for protecting the direct current source according to claim 1, wherein the driver circuit is a driver chip or a set of discrete components which can realize Under Voltage Lock Out.

4. The device for protecting the direct current source according to claim 1, wherein the switching device comprises a second switching transistor, with the second switching transistor being an insulated gate bipolar transistor, a field effect transistor or a triode.

5. The device for protecting the direct current source according to claim 1, wherein the switching device comprises a second switching transistor, a first inductor and a third resistor, wherein the first inductor is connected in parallel with the third resistor, with a first parallel connection point between the first inductor and the third resistor being the first terminal of the switching device, and a second parallel connection point between the first inductor and the third resistor being connected with an input terminal of the second switching transistor, a control terminal of the second switching transistor is the control terminal of the switching device, and an output terminal of the second switching transistor is the second terminal of the switching device.

6. The device for protecting the direct current source according to claim 5, wherein the switching device further comprises a third diode, wherein a cathode of the third diode is connected with the first parallel connection point, and an anode of the third diode is connected with the output terminal of the second switching transistor.

7. The device for protecting the direct current source according to claim 1, wherein the switching device comprises a second switching transistor, a third switching transistor and a third resistor, and the third switching transistor is an insulated gate bipolar transistor, a field effect transistor, a triode or a thyristor, wherein an input terminal of the third switching transistor is connected with a second terminal of the third resistor;

a first terminal of the third resistor is connected with an input terminal of the second switching transistor, with a connection point between the first terminal of the third resistor and the input terminal of the second switching transistor being the first terminal of the switching device, an output terminal of the second switching transistor is connected with an output terminal of the third switching transistor, with a connection point between the output terminal of the second switching transistor and the output terminal of the third switching transistor being the second terminal of the switching device, and a control terminal of the second switching transistor and a control terminal of the third switching transistor each are the control terminal of the switching device, wherein the driving signal comprises a first signal and a second signal, the first signal is a signal for controlling the third switching transistor to be periodically switched on in a case that the enable signal is an OFF-ENABLE signal, and the second signal is a signal for controlling the second switching transistor to be periodically switched on when an output voltage of the direct current source falls below a preset threshold.

8. The device for protecting the direct current source according to claim 1, further comprising a series circuit, wherein the series circuit is connected between the first terminal of the switching device and the positive output terminal of the device for protecting the direct current source, or the series circuit is connected between the second terminal of the switching device and the negative output terminal of the device for protecting the direct current source, and the series circuit is configured to consume the energy stored at an input terminal of an electrical device which is connected with the output terminal of the device for protecting the direct current source in a case that the switching device is switched on, or the series circuit is configured to connect the direct current source with the electrical device in a case that the switching device is switched off.

9. The device for protecting the direct current source according to claim 8, wherein the series circuit comprises a third diode and a third resistor connected in parallel, wherein an anode of the third diode is connected with the connection point between the positive output terminal of the direct current source and the switching device, and a cathode of the third diode is the positive output terminal of the device for protecting the direct current source; or a cathode of the third diode is connected with the connection point between the negative output terminal of the direct current source and the switching device, and an anode of the third diode is the negative output terminal of the device for protecting the direct current source.

10. The device for protecting the direct current source according to claim 8, wherein the series circuit comprises a first inductor and a third resistor connected in parallel, wherein a first connection point between the first inductor and the third resistor is connected with the connection point between the positive output terminal of the direct current source and the switching device, and a second connection point between the first inductor and the third resistor is the positive output terminal of the device for protecting the direct current source; or a first connection point between the first inductor and the third resistor is connected with the connection point between the negative output terminal of the direct current source and the switching device, and a second connection point between the first inductor and the third resistor is the negative output terminal of the device for protecting the direct current source.

11. The device for protecting the direct current source according to claim 1, further comprising a series circuit, wherein the series circuit is connected between the first terminal of the switching device and the positive output terminal of the device for protecting the direct current source, or the series circuit is connected between the second terminal of the switching device and the negative output terminal of the device for protecting the direct current source, and the series circuit is configured to consume the energy stored at an input terminal of an electrical device which is connected with the output terminal of the device for protecting the direct current source in a case that the switching device is switched on, or the series circuit is configured to connect the direct current source with the electrical device in a case that the switching device is switched off.

12. The device for protecting the direct current source according to claim 1, further comprising a series circuit, wherein the series circuit is connected between the first terminal of the switching device and the positive output terminal of the device for protecting the direct current source, or the series circuit is connected between the second terminal of the switching device and the negative output terminal of the device for protecting the direct current source, and the series circuit is configured to consume the energy stored at an input terminal of an electrical device which is connected with the output terminal of the device for protecting the direct current source in a case that the switching device is switched on, or the series circuit is configured to connect the direct current source with the electrical device in a case that the switching device is switched off.

13. A method for protecting a direct current source, applied in the device for protecting the direct current source according to claim 1, the method comprising:
    storing, by a hiccup driver circuit, electric energy outputted from a direct current source;
    receiving, by the hiccup driver circuit, an enable signal;
    generating, by the hiccup driver circuit, a driving signal based on the enable signal and the electric energy stored internally; and
    switching on the switching device periodically based on the driving signal in a case that the enable signal is an OFF-ENABLE signal.

14. The method for protecting the direct current source according to claim 13, wherein the hiccup driver circuit comprises a voltage limiting circuit and a driver circuit, wherein the process of storing, by a hiccup driver circuit, electric energy outputted from a direct current source; receiving, by the hiccup driver circuit, an enable signal; and generating, by the hiccup driver circuit, a driving signal based on the enable signal and the electric energy stored internally, comprises:
    storing, by the voltage limiting circuit, the electric energy outputted from the direct current source; and
    generating, by the voltage limiting circuit, a supply voltage based on the electric energy stored internally;
    receiving, by the driver circuit, the enable signal;
    generating, by the driver circuit, a driving signal for controlling the switching device to be switched on and consuming the electric energy stored internally in a case that the enable signal is an OFF-ENABLE signal and the supply voltage meets a first preset condition; and
    generating a driving signal for controlling the switching device to be switched off in a case that the enable signal is a NON-OFF-ENABLE signal or the supply voltage meets a second preset condition.

15. The method for protecting the direct current source according to claim 14, wherein the first preset condition is that the supply voltage is equal to or higher than a preset upper protection voltage limit, and the second preset condition is that the supply voltage is less than a preset lower protection voltage limit.

16. The method for protecting the direct current source according to claim 15, wherein the device for protecting the direct current sources further comprises a series circuit, wherein the method for protecting the direct current source further comprises:
    in the process of switching on the switching device periodically based on the driving signal, consuming, by the series circuit in a case that the switching device is switched on, the energy stored at an input terminal of an electrical device which is connected with the output terminal of the device for protecting the direct current source.

17. The method for protecting the direct current source according to claim 14, wherein the device for protecting the direct current sources further comprises a series circuit, wherein the method for protecting the direct current source further comprises:
    in the process of switching on the switching device periodically based on the driving signal, consuming, by the series circuit in a case that the switching device is switched on, the energy stored at an input terminal of an electrical device which is connected with the output terminal of the device for protecting the direct current source.

18. The method for protecting the direct current source according to claim 13, wherein the device for protecting the direct current sources further comprises a series circuit, wherein the method for protecting the direct current source further comprises:
    in the process of switching on the switching device periodically based on the driving signal, consuming, by the series circuit in a case that the switching device is switched on, the energy stored at an input terminal of an electrical device which is connected with the output terminal of the device for protecting the direct current source.

* * * * *